United States Patent [19]

Sekibe et al.

[11] Patent Number: 5,579,500
[45] Date of Patent: Nov. 26, 1996

[54] CONTROL APPARATUS FOR CONTROLLING DATA READ ACCESSES TO MEMORY AND SUBSEQUENT ADDRESS GENERATION SCHEME BASED ON DATA/MEMORY WIDTH DETERMINATION AND ADDRESS VALIDATION

[75] Inventors: Tsutomu Sekibe; Tomohiko Kitamura; Toshiyuki Ochiai, all of Osaka, Japan

[73] Assignee: Matsushita Electric Industrial Co., Ltd., Osaka, Japan

[21] Appl. No.: 200,217

[22] Filed: Feb. 23, 1994

[30] Foreign Application Priority Data

Feb. 24, 1993 [JP] Japan ................................. 5-035092

[51] Int. Cl.$^6$ ................................................. G06F 12/02
[52] U.S. Cl. ........................................ 395/421.1; 395/403
[58] Field of Search .......................... 364/200 MS File, 364/900 MS File; 395/401–406, 464, 465, 471, 497.02, 497.03, 414, 421.02, 421.04, 421.1

[56] References Cited

U.S. PATENT DOCUMENTS

| | | | |
|---|---|---|---|
| 4,691,277 | 9/1987 | Kronstadt et al. | 395/421.03 |
| 4,872,138 | 10/1989 | Ciacci | 365/49 |
| 4,914,575 | 4/1990 | Kihara et al. | 395/484 |
| 5,157,776 | 10/1992 | Foster | 395/458 |

FOREIGN PATENT DOCUMENTS

| | | |
|---|---|---|
| 0293720 | 5/1988 | European Pat. Off. . |
| 0505157 | 3/1992 | European Pat. Off. . |
| 60-24663 | 2/1985 | Japan . |
| 60-221857 | 11/1985 | Japan . |
| 63-89954 | 4/1988 | Japan . |
| 63-271647 | 11/1988 | Japan . |

OTHER PUBLICATIONS

IBM Technical Disclosure Bulleting, vol. 31, No. 3, Aug. 1988, New York, pp. 303–306, 'High performance microprocessor memory system'.

*Primary Examiner*—Matthew M. Kim
*Attorney, Agent, or Firm*—Price, Gess & Ubell

[57] ABSTRACT

An apparatus and method for controlling data read access to memory, in response to an access request sent through a system bus. The apparatus includes an data storage device for preserving data corresponding to a predetermined address; a judging device for judging whether an access address indicated by the access request matches the predetermined address; and a control device for making the data storage device output data preserved therein to the system bus when the access address has been judged to match the predetermined address, and for making the data storage device hold data corresponding to a next address subsequent to the access address when the access address has been judged not to match the predetermined address.

6 Claims, 16 Drawing Sheets access data size determining unit latch control unit

Fig. 13A logic121

| input | output |
|---|---|
| reset | xbusy=1 |
| xsp=0 | xbusy=0 |
| noacc=1, xcahit=0, xdrdy=0 | xbusy=1 |
| xrdy=0, (xdsr and xdsw)=0, A=0<br>A=((ct ex-nor xcahit) or naacc) | xbusy=0 |

Fig. 13B logic123

| input | output |
|---|---|
| reset | xas=1 |
| xgo=0 | xas=0 |
| xas=1, xrdy=0 | xas=1 |
| xas=1, xrw=1, ((ct ex-nor xcahit) or noacc)=1 | xas=0 |

Fig. 13C logic125

| input | output |
|---|---|
| reset | xdrdy=1 |
| vrw=1, xcahit=0, xso=0 | xdrdy=0 |
| xcahit=1, xbusy=0, xdsr=0, ct=1, noacc=0 | xdrdy=0 |
| the others and clock input | xdrdy=1 |

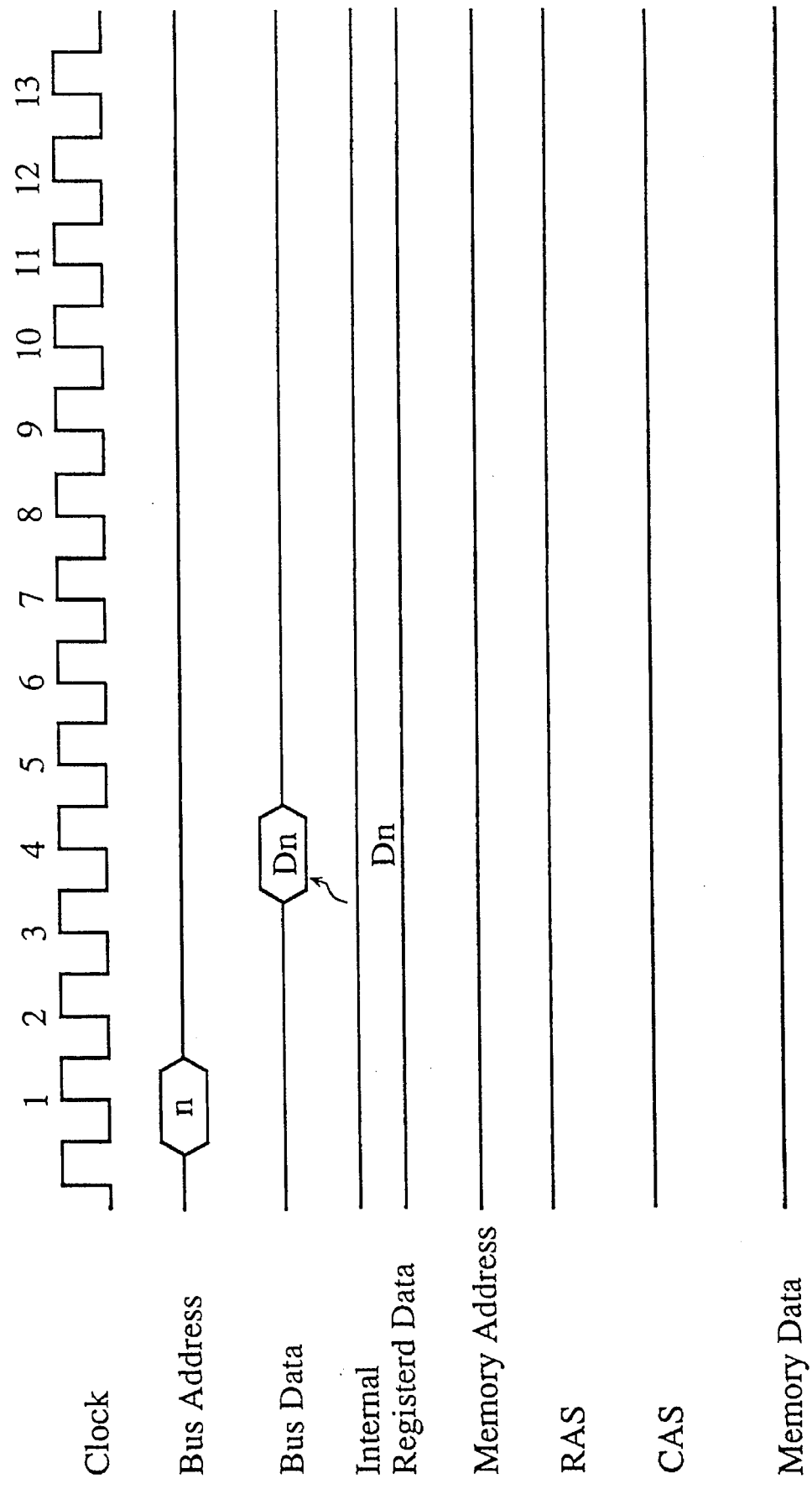

CONTROL APPARATUS FOR CONTROLLING DATA READ ACCESSES TO MEMORY AND SUBSEQUENT ADDRESS GENERATION SCHEME BASED ON DATA/MEMORY WIDTH DETERMINATION AND ADDRESS VALIDATION

BACKGROUND OF THE INVENTION (1) Field of the Invention

The present invention relates to an apparatus and method for achieving a high-speed data read access to contiguous areas in noncachable memory such as frame buffers.

(2) Description of the Related Art

Cache memory has been commonly used in order to achieve high-speed data read access to memory. Cache memory was originally supplied to main memory to speed up its low access rate by the use of cache, but has recently been supplied, as disk cache memory, to secondary memory such as hard disk.

However, some memory or memory areas are not cachable depending on their usage. For example, a frame buffer which stores display data or image data to be displayed on a display device is not cachable because the contents of these data are directly displayed on the display device.

FIG. 1 shows the construction of a typical conventional apparatus for achieving high-speed data read access to noncachable memory.

In the illustration, the typical conventional apparatus 61 is provided with a bus address and control signal decoder 611, a memory address and control signal generator 612, a memory data controller 613, and a bus data controller 614, thereby controlling data access from a processor (not shown) to memory 62 via a system bus 60.

The bus address and control signal decoder 611 (hereinafter referred to as BA decoder 611) decodes the address and size of data sent through the system bus 60.

The memory address and control signal generator 612 (hereinafter referred to as MA generator 612) generates a row address and a column address, based on the results found out by the BA decoder 611, thereby sending it to the memory 62.

The memory data controller 613 (hereinafter referred to as MD controller 613) controls data input/output operations between the BD controller 614 and the memory 62.

The bus data controller 614 (hereinafter referred to as BD controller 614) controls data input/output operations between the MD controller 613 and the system bus 60.

The apparatus 61 provided with these components operates as follows.

FIG. 2 shows a time chart depicting a data readout operation carried out by the apparatus 61.

Receiving signals indicating the address and size of data to be accessed through the system bus 60, the BA decoder 611 decodes the signals. The MA generator 612 generates a row address and a column address, based on the results decoded by the BA decoder 611, thereby starting to access the memory 62. After a certain period of access time, data read out from the memory 62 are sent out to the system bus 60 through the MD controller 613 and the BD controller 614.

FIG. 3 shows a time chart depicting a data readout operation when data to be accessed are larger than the memory 62 in width. This case is called burst transmission, where the MA generator 612 performs page mode access by outputting serial column addresses on end to the memory 62. This allows a plurality of data to be sent out to the system bus 60 within a short time period.

As explained hereinabove, according to the conventional apparatus, control signals to the memory 62 are generated by the MA generator 612 in response to an access request sent through the system bus 60. And access to contiguous areas, which frequently occurs is controlled by page mode access, thereby achieving a high-speed data access.

However, the conventional apparatus has the following drawback.

Burst transmission is not requested on noncachable memory such as frame memory and VRAM, or noncachable memory area so that contiguous areas in such memory are accessed normally, demanding the same amount of time for each access. As a result, high-speed data access cannot be achieved.

SUMMARY OF THE INVENTION

A first object of this invention is to provide an apparatus for achieving a high-speed data read access to contiguous areas in noncachable memory.

A second object of this invention is to provide a method for achieving a high-speed data read access to contiguous areas in noncachable memory.

The first object can be achieved by the following apparatus for controlling data read access to memory, in response to an access request sent through a system bus. The apparatus includes the following units: a data storage unit for preserving data corresponding to a predetermined address; a judging unit for judging whether an access address indicated by the access request matches the predetermined address; and a control unit for making the data storage unit output data preserved therein to the system bus when the access address has been judged to match the predetermined address, and for making the data storage unit hold data corresponding to a next address subsequent to the access address when the access address has been judged not to match the predetermined address.

The memory may be unsuitable to be applied cache memory or be a frame memory for storing image data.

The above-mentioned next address may indicate data subsequent to data corresponding to the access address, the data indicated by the next address having the same data width as the memory.

The above-mentioned data storage unit may include the following units: a data latch unit for latching the data outputted from the memory; and a selection unit for selecting the data latched by the data latch unit when the access address has been judged to match the predetermined address and for selecting data outputted from the memory when the access address has been judged not to match the predetermined address, thereby forwarding selected data to the system bus. The above-mentioned judging unit may include the following units: an address storage unit for preserving an address indicating the data latched by the data latch unit; and a hit judging unit for judging whether the access address matches the address preserved in the address storage unit.

The above-mentioned control unit may include an address generation unit for generating the next address when the access address has been judged to match the address preserved in the address storage unit, and for generating the access address and the next address in sequence and forwarding to the control unit when the access address has been judged not to match the address preserved in the address storage unit.

The address generation unit may include the following units: a first incrementer for incrementing the access address; a first selector for selecting an output of the first incrementer when the access address has been judged to match the address preserved in the address storage unit and selecting the high order address when the access address has been judged not to match the address preserved in the address storage unit; a latch circuit for latching an output of the first selector; a second incrementer for incrementing the output of the first selector; and a second selector for selecting an output of the latch circuit when the access address has been judged to match the address preserved in the address storage unit and for selecting the output of the latch circuit and then selecting an output of the second incrementer, thereby outputting the output of the second incrementer as an access address to the memory when the access address has been judged not to match the address preserved in the address storage unit.

The control unit may further include the following units: a latch control unit for, when data are read our from the memory, making the data latch unit latch the data, which corresponds to the next address generated by the address generation unit, wherein the control unit controls the data read access to the memory by the use of the access address outputted from the address generation unit.

The judging unit may further include a validity judging unit for judging whether the data preserved in the data storage unit are valid or invalid and for informing the judging unit of a result judged by the validity judging unit. The hit judging unit may judge that the access address matches the address preserved in the address storage unit, when informed of invalidity.

The judging unit may further include a data size judging unit for detecting that access data have smaller data width than the memory and do not include a final position of the data width of the memory and for informing the address generation unit of a result detected by the data size judging unit. The address generation unit may suspend an operation of generating the next address, on receiving the result.

According to the apparatus with the above-mentioned construction, high-speed access to contiguous areas in noncachable memory such as frame memory and VRAM, or noncachable memory area can be achieved without burst transmission.

The second object can be achieved by the method described below for controlling data read access in an apparatus for reading data from memory, in response to an access request sent through a system bus.

The apparatus includes the following units: a data storage unit for preserving data corresponding to a predetermined address; a judging unit for judging whether an access address indicated by the access request matches the predetermined address; and a control unit for making the data storage unit output data preserved therein to the system bus when the access address has been judged to match the predetermined address, and for making the data storage unit hold data corresponding to a next address subsequent to the access address when the access address has been judged not to match the predetermined address.

The method has the steps of: judging whether the access address matches the predetermined address, responding to the access request; outputting the data held in the data storage unit to the system bus, when the access address has been judged to match the predetermined address; reading the next address and storing to the data storage unit; outputting the data corresponding to the access address when the access address has been judged not to match the predetermined address; and storing the data corresponding to the next address to the data storage unit when the access address has been judged not to match the predetermined address.

The memory may be unsuitable to be applied cache memory or be a frame memory for storing image data.

The next address may indicate data subsequent to data corresponding to the access address, the data indicated by the next address having the same data width as the memory.

The method provided with the above mentioned construction can expect the same effects as the above-mentioned apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 13A–13C show the input/output logic of the logical circuits 121, 123, and 125.

FIG. 17 shows a time chart depicting a data readout operation when the access address matches the address of data held in the data storage unit and is not the final address.

DESCRIPTION OF THE PREFERRED EMBODIMENT

Figure 1:
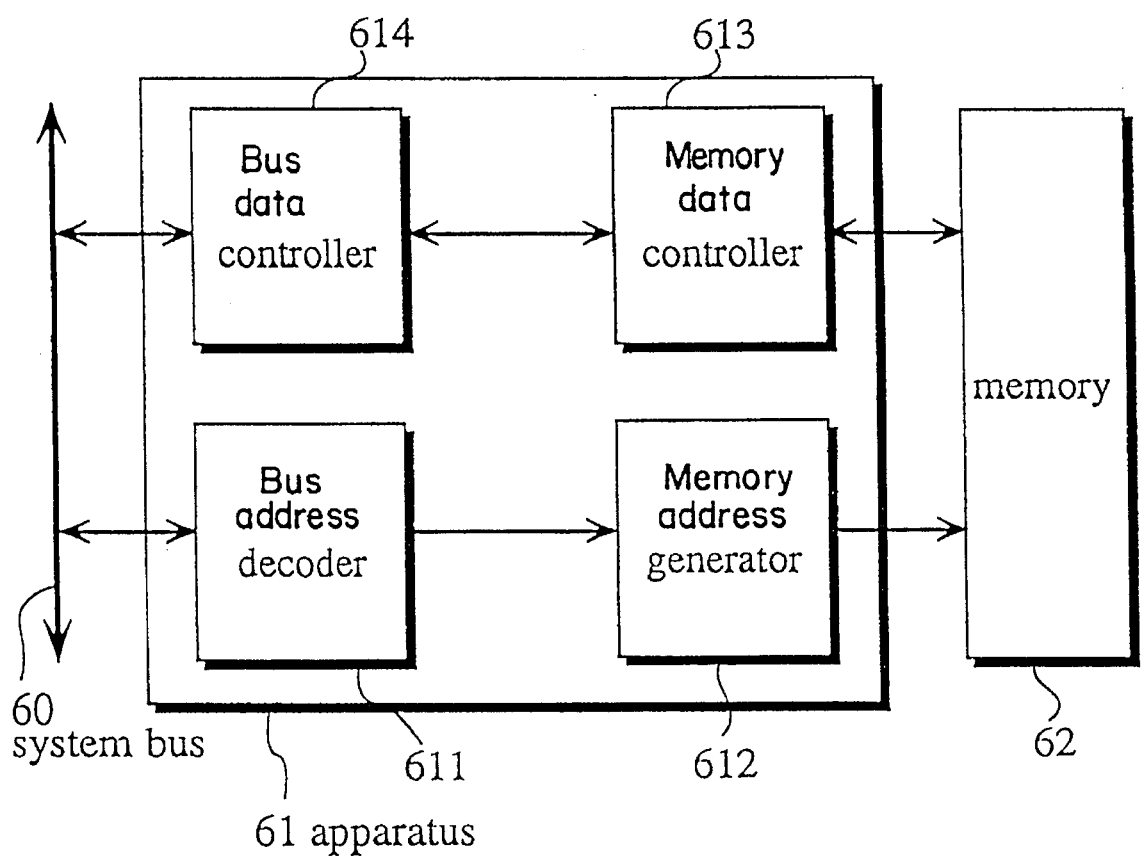
FIG. 1 shows the construction of a typical conventional apparatus for achieving high-speed data read access to noncachable memory.
Figure 2:
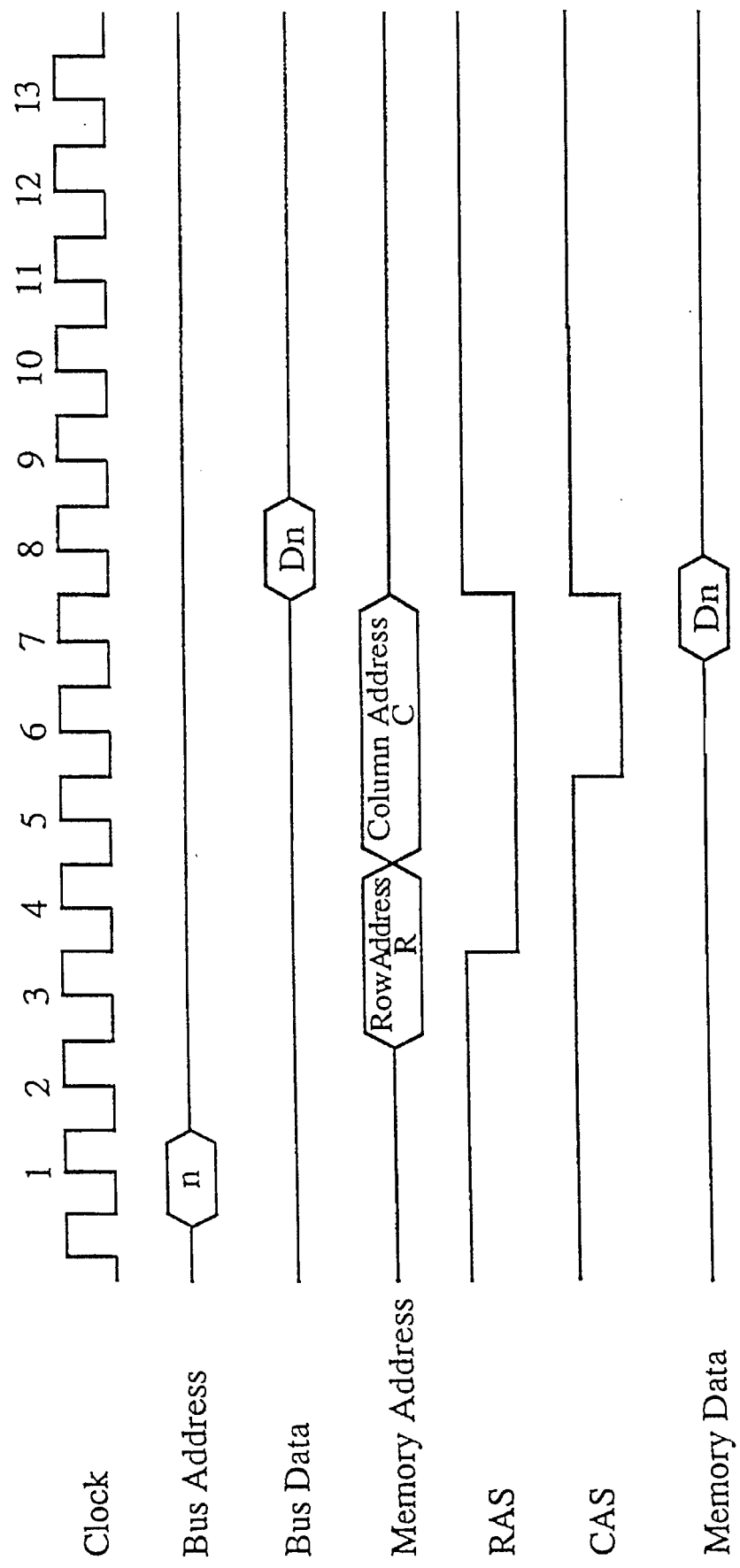
FIG. 2 shows a time chart depicting a data readout operation carried out by the typical conventional apparatus.
Figure 3:
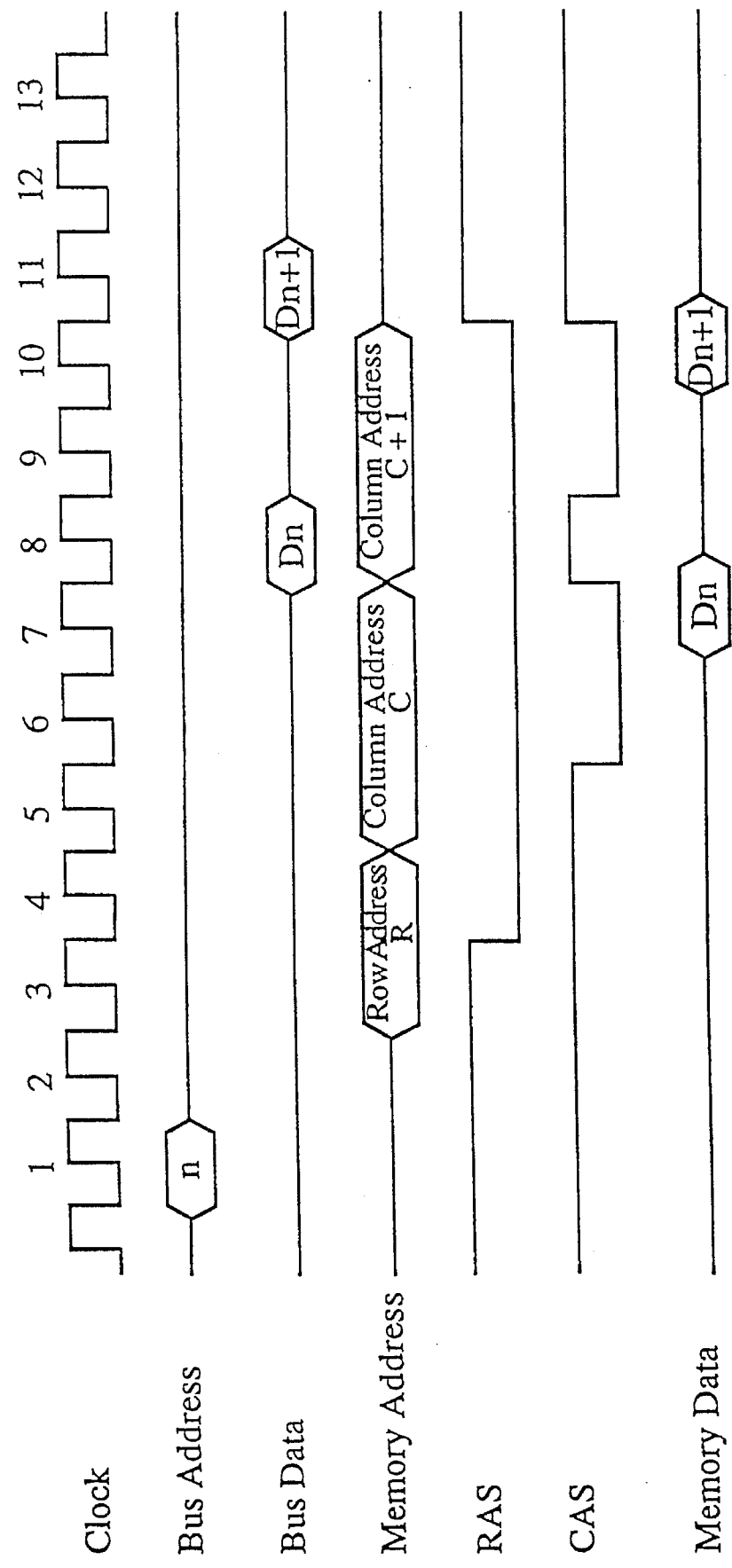
FIG. 3 shows a time chart depicting a data readout operation when data to be accessed are larger than the memory in width.
Figure 4:
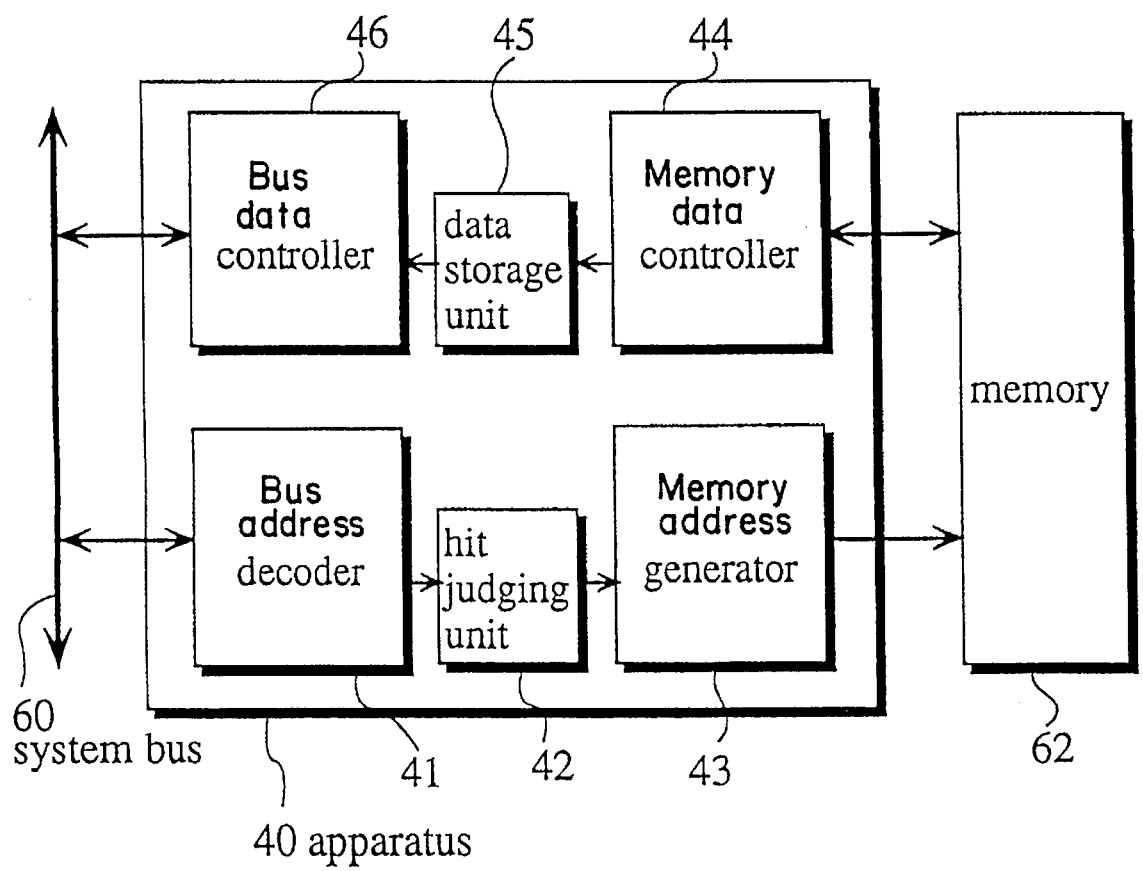
FIG. 4 shows the construction of the apparatus for achieving high-speed data read access to the memory according to this invention.

FIG. 4 shows the construction of the apparatus for achieving high-speed data read access to memory according to this invention.

In the illustration, the apparatus 40 according to this invention is provided with a bus address and control signal decoder 41, a hit judging unit 42, a memory address and control signal generator 43, a memory data controller 44, a data storage unit 45, and a bus data controller 46, thereby controlling data read access from a processor (not shown) to memory 62 via a system bus 60.

The bus address and control signal decoder 41 (hereinafter referred to as BA decoder 41) decodes the address and size of data to be accessed (hereinafter referred to as access data) and signals sent through the system bus 60. The signals are needed for controlling data access to the memory 62.

The hit judging unit 42 judges whether the address of the access data and the address of data held in the data storage unit 45 match each other. If they do, the hit judging unit 42 makes the data storage unit 45 send out the data of its own to the system bus 60, and hold the data corresponding to the address subsequent to the address for the data held in the data storage unit 45. On the other hand, if they do not match, the hit judging unit 42 makes the memory address and control signal generator 43 allow the memory 62 to transmit the access data to the system bus 60 and the data storage unit 45 hold the data corresponding to the address subsequent to the access data.

The memory address and control signal generator 43 (hereinafter referred to as MA generator 43) generates a column address, a row address, and signals required for controlling data access to the memory, based on the results decoded by the BA decoder 41 and an instruction of the hit judging unit 42, thereby forwarding to the memory 62.

The memory data controller 44 (hereinafter referred to as MD controller) controls data input/output operations between the memory 62 and either the data storage unit 45 or the BD controller 46.

The data storage unit 45 holds data which have been read out from the memory 62, based on an instruction of the hit judging unit 42 and forwards the data to the BD controller 46.

The BD controller 46 controls data input/output operations between the system bus 60 and either the MD controller 44 or the data storage unit 45.

Construction of the hit judging unit 42

Figure 5:
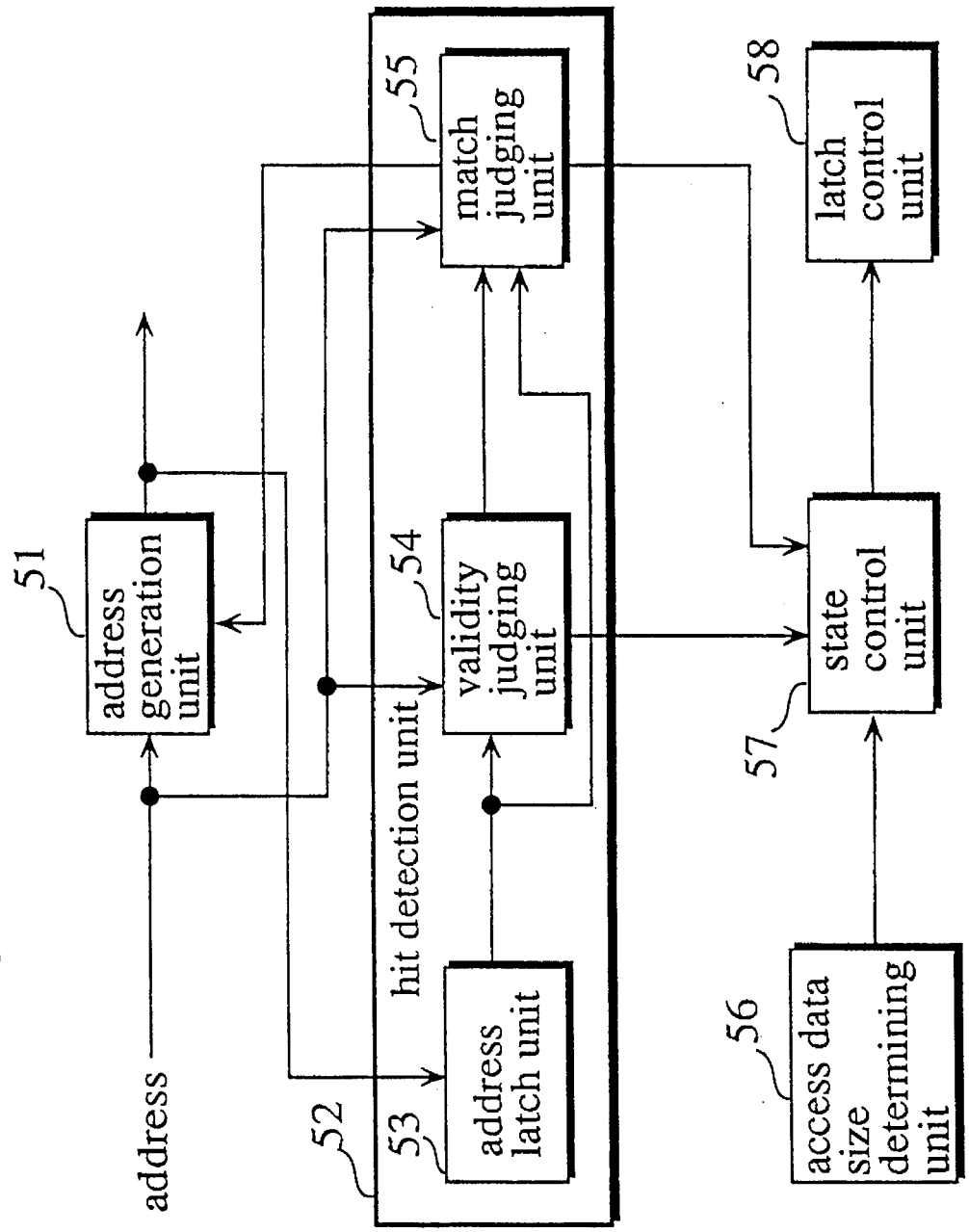
FIG. 5 shows the construction of the hit judging unit.

FIG. 5 shows the construction of the hit judging unit 42, which is provided with an address generation unit 51, a hit detection unit 52, an access data size determining unit 56, a state control unit 57, and a latch control unit 58. The hit detection unit 52 includes an address latch unit 53, a validity judging unit 54, and a match judging unit 55.

The hit detection unit 52 judges whether the address to be accessed (hereinafter referred to as access address) and the address for the data stored in the data storage unit 45 match.

The address latch unit 53 latches the address of data to be held by the data storage unit 45 among all the addresses generated by the address generation unit 51. In other words, the address latch unit 53 holds the address in the memory 62 corresponding to the data held in the data storage unit 45.

The validity judging unit 54 judges whether the data held in the data storage unit 45 are valid, thereby holding a valid flag indicating the judged results.

The match judging unit 55 judges whether the access address and the address held in the address latch unit 53 match, thereby outputting the judged results to the address generation unit 51.

The address generation unit 51 generates access addresses, according to an instruction of the match judging unit 55.

More specifically, when the match judging unit 55 has judged the addresses to match, an address subsequent to the access address is generated. In contrast, when the match judging unit 55 has judged them not to match, the access address and the subsequent address are generated in sequence.

The access data size determining unit 56 determines the width of access data and also determines where in the memory 62 the access data are located. For example, when the memory 62 has 64-bit width, the access data can be either 64, 32, 16, or 8 bits in the 64-bit width.

The state control unit 57 determines whether the data in the data storage unit 45 should be updated, based on the valid flag of the validity judging unit 54 and the results judged by the match judging unit 55 and the access data size determining unit 56.

The latch control unit 58 controls the data storage unit 45 to hold the data which have been read out from the memory 62, based on the results judged by the state control unit 57.

Detailed construction of the apparatus 40

Figure 6:
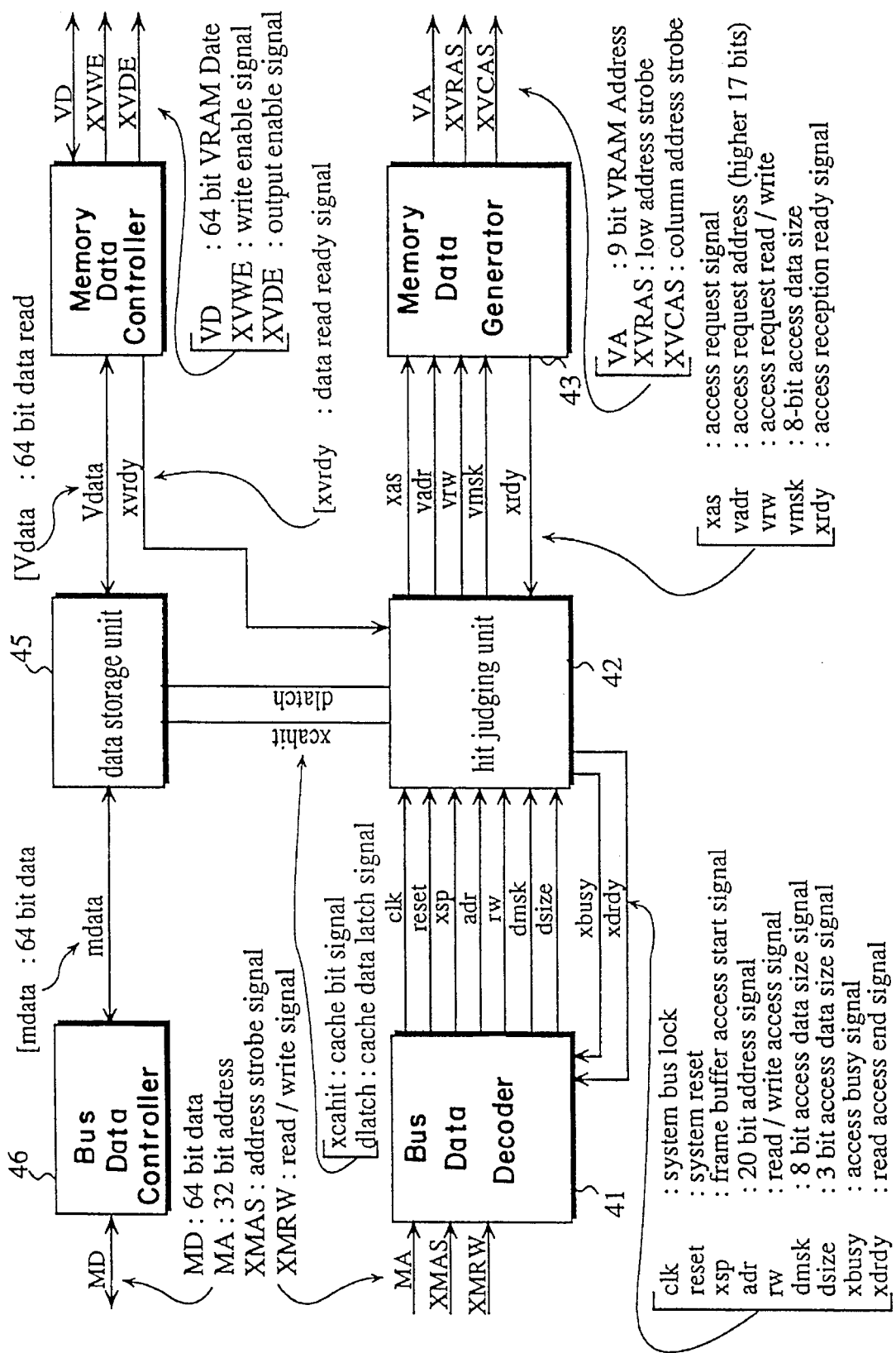
FIG. 6 shows all the signals used in the apparatus, each of the signals is given a name implying its function.

FIG. 6 shows all the signals used in the apparatus 40, each of the signals is given a name implying its function. For example, signals from the system bus 60 to the BA decoder 41 are named MA, XMAS, and XMRW, which respectively imply "32 bit access address", "address strobe signal" and "read/write signal".

Figure 7:
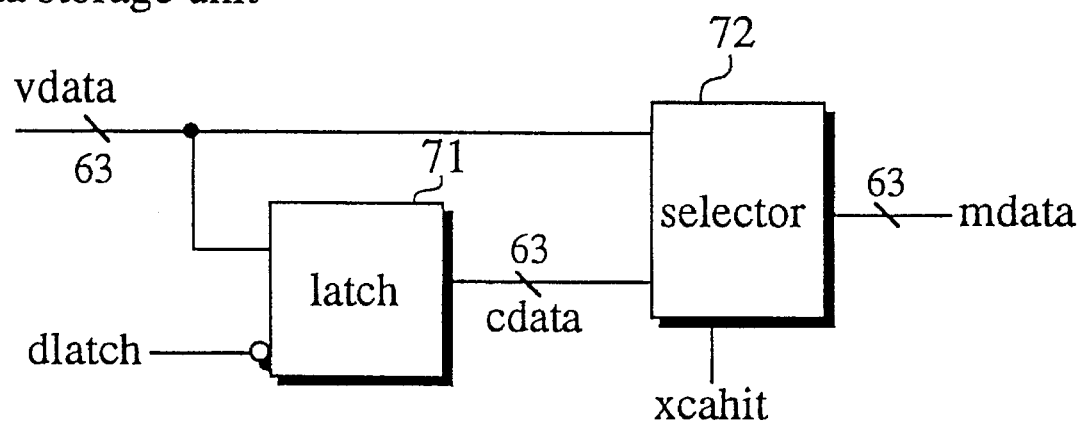
FIG. 7 shows a specific circuit of the data storage unit provided with a latch and a selector.

FIG. 7 shows a specific circuit of the data storage unit 45 provided with a latch 71 and a selector 72.

The latch 71 latches 64-bit data "vdata" read out from the memory 62, responding to a signal "dlatch" sent from the hit judging unit 42.

The selector 72 selects between the data "vdata" sent from the memory 62 and data "cdata" held by the latch 71, in accordance with a signal "xcahit" sent from the hit judging unit 42. More specifically, when the data corresponding to the access address is held by the latch 71 (xcahit=0), the data "cdata" are selected and otherwise (xcahit=1), the data "vdata" are selected, thereby outputting data thus selected, as "mdata" to the BD controller 46.

Figure 8:
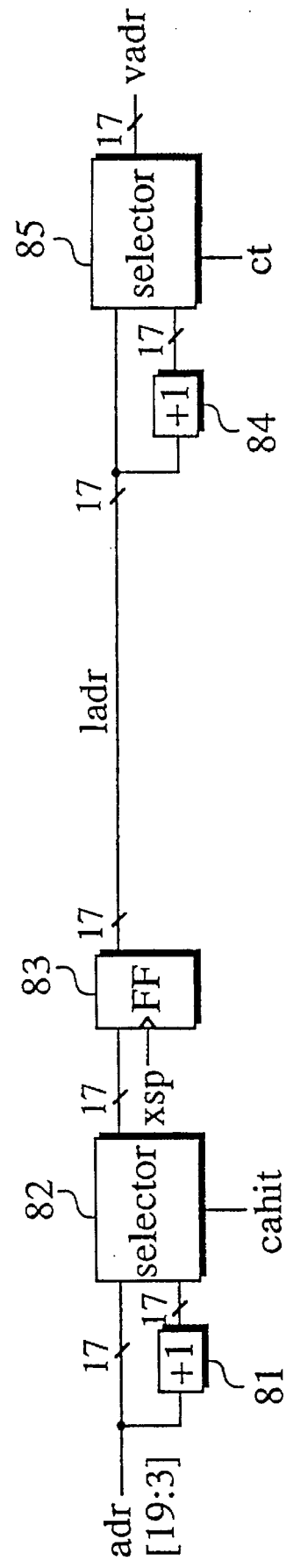
FIG. 8 shows a specific circuit of the address generation unit.

FIG. 8 shows a specific circuit of the address generation unit 51 provided with incrementers 81 and 84, selectors 82 and 85, and a D flip-flop 83 (hereinafter referred to as FF 83).

The selector 82, when the data corresponding to the access address are held in the latch 71 (cahit=1), outputs an address outputted from the incrementer 81, the address being subsequent to the access address, and otherwise (cahit=0), outputs the access address.

The FF 83 holds an address thus sent from the selector 82 in accordance with a signal "xsp" indicating the start of access to the memory 62.

The selector 85 selects the address held in the FF 85 when the data corresponding to the access address are not held in the latch 71 or when a single access to the memory is needed. The selector 85 then selects, if necessary, an address sent from the incrementer 84, the address being subsequent to the access address and outputs it as an address "vadr" requesting access to the memory 62.

Figure 9:
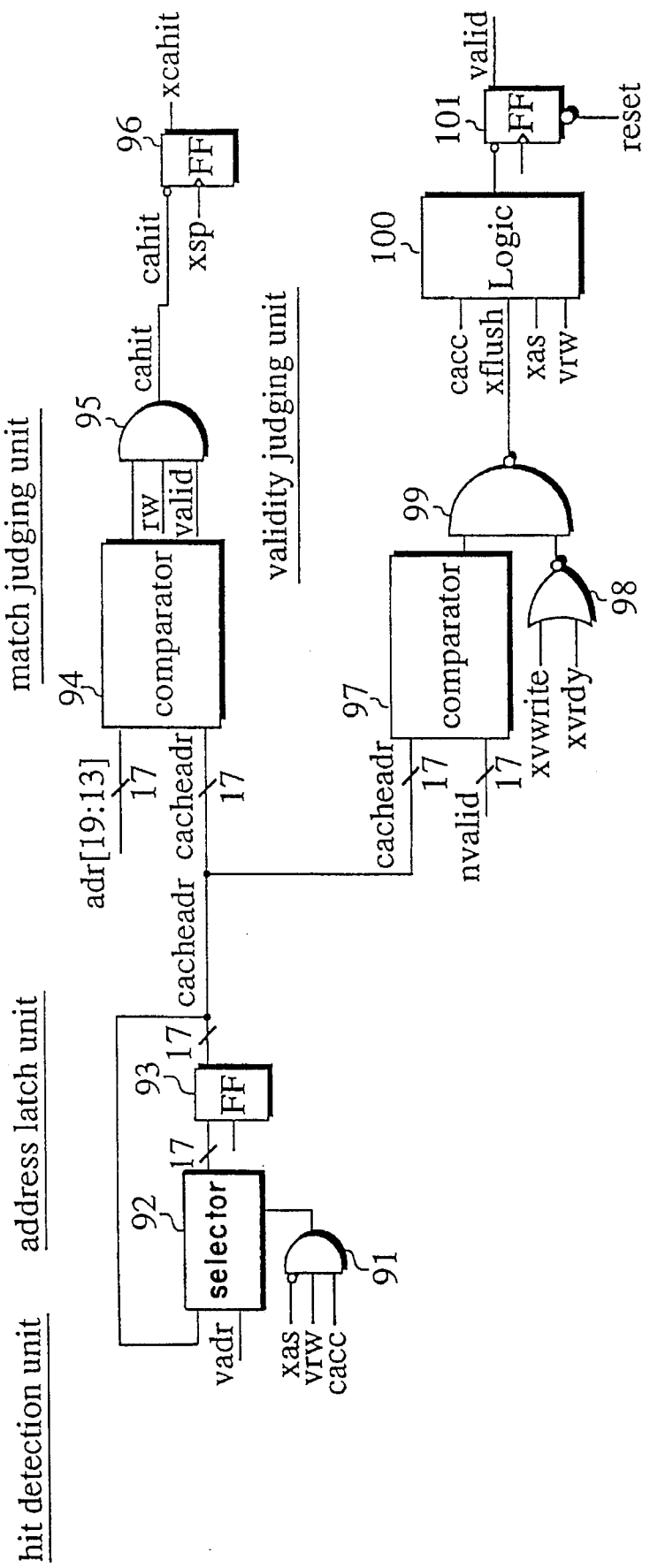
FIG. 9 shows each specific circuit of an address latch unit, a validity judging unit, and a match judging unit provided in the hit detection unit.

FIG. 9 shows each specific circuit of the address latch unit 53, the validity judging unit 54, and the match judging unit 55 provided in the hit detection unit 52.

The address latch unit 53

In FIG. 9, the address latch unit 53, which is provided with an AND gate 91, a selector 92, and FFs 93, holds an address for the data held by the data storage unit 45.

The AND gate 91 detects a timing for starting to write data to the data storage unit 45 and for starting to read data from the memory 62.

The selector 92 selects an address "vadr" requesting read access to the memory 62 in the timing detected by the AND gate 91. In other timing, the latch address "cacheadr" of the FFs 93 is selected.

The FFs 93 latch an output of the selector 92 and sends it out as the latch address "cacheadr".

The validity judging unit 54, which is composed of a comparator 97, a NOR gate 98, a NAND gate 99, a logic circuit 100, and an FF 101, judges whether data held in the data storage unit 45 are valid or not.

The comparator 97 compares the latch address "cacheadr" sent from the FFs 93 and the address "vadr" requesting read access, thereby judging whether they match or not.

The NOR gate 98 detects write access in process.

The NAND gate 99 detects the completion of write access for the latch address "cacheadr", and sends out a signal "xflush" for nullifying the data in the data storage unit 45.

The logic circuit 100 judges whether data held in the data storage unit 45 are valid or not, based on the signal "xflush" and other signals.

The FF 101 holds the results judged by the NAND gate 99. In other words, the FF 101 holds the bits "valid" indicating the validity or invalidity of data held in the data storage unit 45.

The match judging unit 55, which is composed of a comparator 94, an AND gate 95, and an FF 96, judges whether the address of data held in the data storage unit 45 and an address to be read out from the memory 62 match each other.

The comparator 94 judges whether the access address "adr" and the address "cacheadr" sent from the FFs 93 match or not.

The AND gate 95, when the comparator 94 has judged these addresses are identical, checks whether the data in the data storage unit 45 are valid or not. If they are valid, then the AND gate 95 outputs a signal "cahit=1" indicating that the data corresponding to the access address are held in the latch 71 of the data storage unit 45.

The FF 96 latches a logically reversed "cahit" when access to the memory 62 is started.

Figure 10:
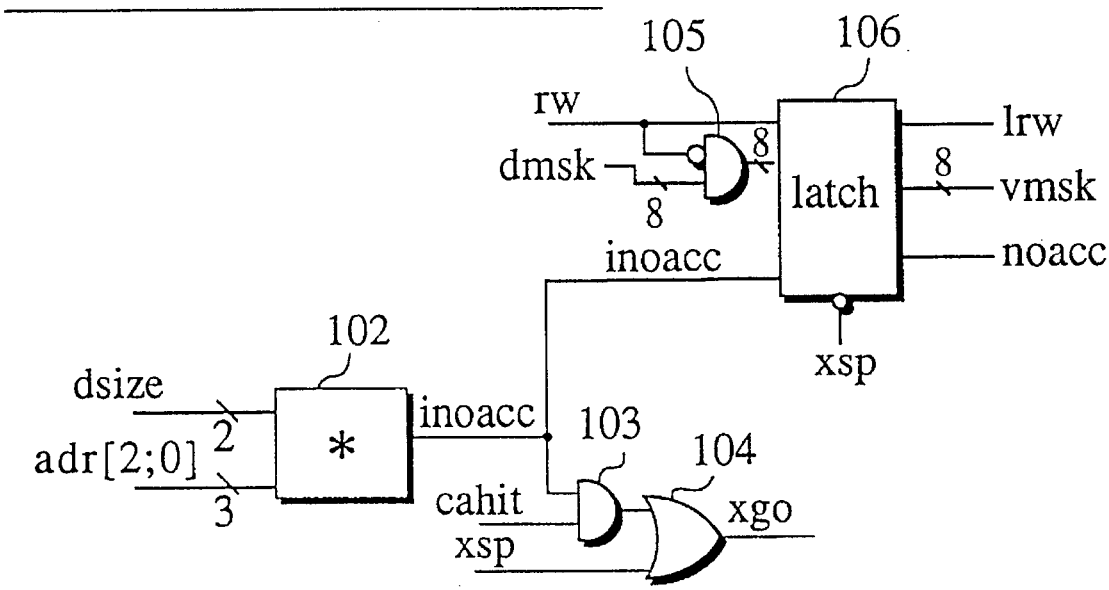
FIG. 10 shows a specific circuit of the access data size determining unit.

FIG. 10 shows a specific circuit of the access data size determining unit 56 provided with a logic circuit 102, AND gates 103 and 105, an OR gate 104, and a latch 106. The access data size determining unit 56 determines the width of access data and where in the 64-bit memory 62 the data are located.

The logic circuit 102 receives a 2-bit signal "dsize" indicating which of 64, 32, 16, or 8 bits the width of the access data is, and the low order 3 bits of the access address indicating where in the 64 bits the access address is located.

Then, the logical circuit 102 outputs a signal "inoacc" indicating whether the access data are within 64 bits.

The AND 103 and OR 104 send out a signal "xgo" indicating the start of read access when "cahit"=1.

For read access, the latch 106 latches a signal "rw" indicating read access or write access, an 8-bit signal "dmsk" inputted through the AND gate 105 indicating the byte position of read access, and the "inoacc" sent from the logic circuit 102. Then the latch 106 outputs a signal "lrw" indicating read or write, a signal "vmsk" indicating the byte position, and a signal "noacc" indicating that write access to the data storage unit 45 has been prohibited.

Figure 11:
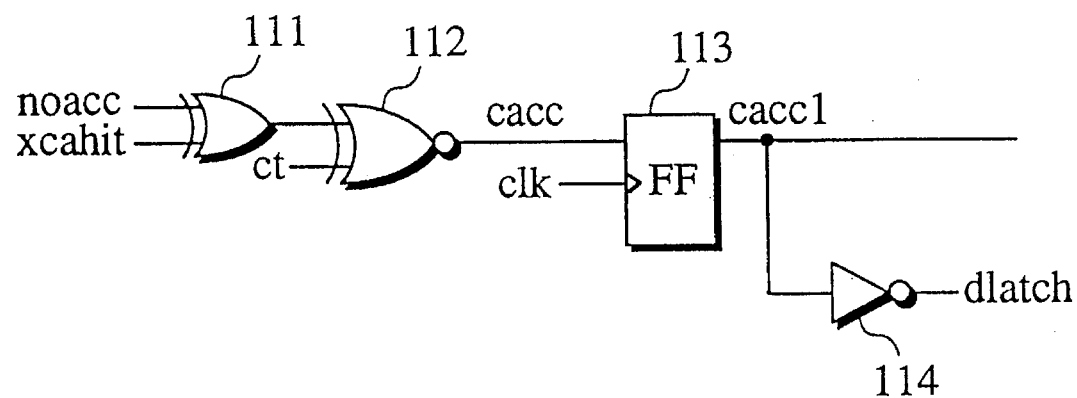
FIG. 11 shows a specific circuit of the latch control unit.

FIG. 11 shows a specific circuit of the latch control unit 58.

An EOR 111 and an ENOR 112 determine whether data should be written to the data storage unit 45, based on the signals "noacc" and "xcahit". As a result, the FF 113 sends out a signal "caccl" indicating the execution of write access to the data storage unit 45 in synchronization with the "clk", and the NOT 114 sends out a signal "dlatch" indicating read access to the data storage unit 45.

Figure 12:
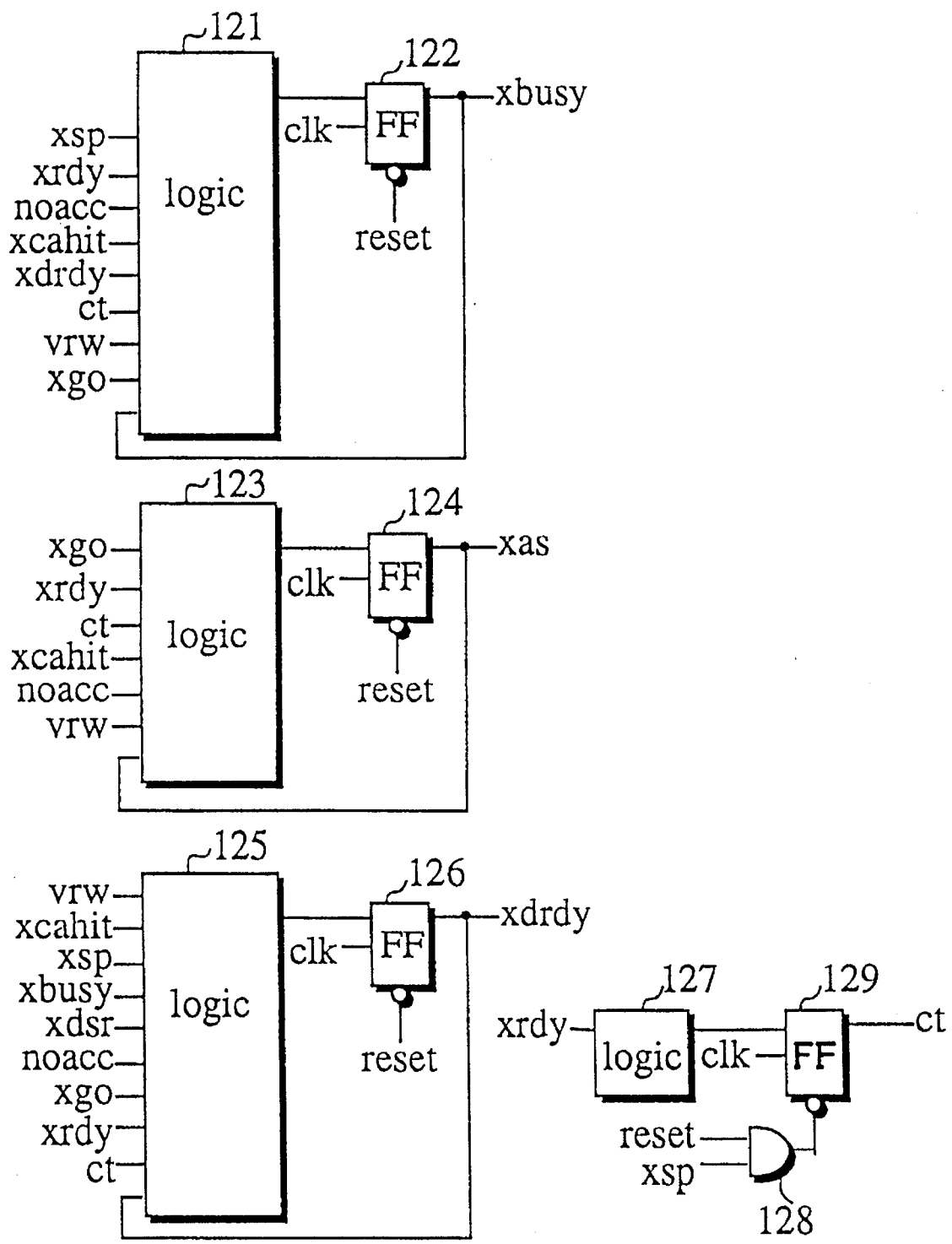
FIG. 12 shows a specific circuit of the state control unit.

FIG. 12 shows a specific circuit of the state control unit 57.

Logic circuits 121, 123, and 125 judge the state of access, based on respective input signals, and respectively send out a signal "xbusy" indicating that the access is in process, a signal "xas" requesting access, and a signal "xdrdy" indicating the completion of read access through FFs 122, 124, and 126.

The input/output logic of the logical circuits 121, 123, and 125 are shown in FIGS. 13A–13C. The equations in each input column are AND requirements, and when these requirements are satisfied, the values shown in each output column are sent out. For example, in FIG. 13A, when the input signals are noacc=1, xcahit=0, and xdrdy=0, then the output signal becomes xbusy=1.

The apparatus 40 constructed as mentioned above operates as follows.

The BA decoder 41 receives the access address "MA", the address strove signal "XMAS", and a read/write signal."MRW" through the system bus 60, and upon request, sends out decoded results to the hit judging unit 42. According to the results, the hit detection unit 52 judges whether the access address and the address for data held in the data storage unit 45 match each other.

At the same time, the access data size determining unit 56 finds out whether the access data has the same width as the memory 62 and further finds out where in the 64 bits the access data are located.

The read access is carried out as follows, depending on whether the access data have 64-bit width like the memory 64 or have smaller width.

(1) When the access data have the same width as the memory 64

(1.1) When the access address and the address for data held in the data storage unit 45 do not match each other.

The hit judgement unit 42 requests the MA generator 43 to read out the data corresponding to a designated access address and the data corresponding to the address subsequent to the access address.

Figure 14:
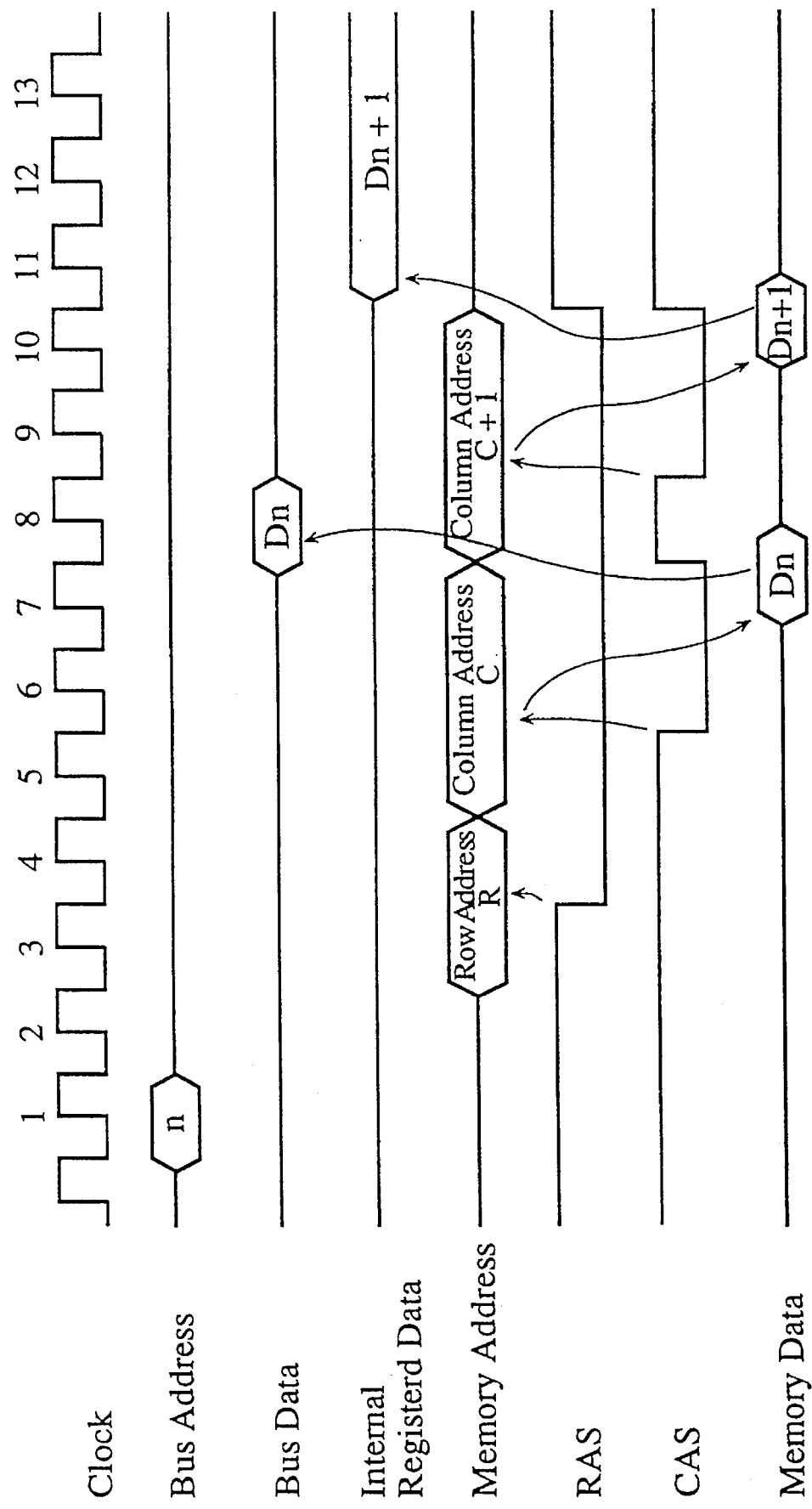
FIG. 14 shows a time chart depicting a data readout operation when an access address and the address for data held in the data storage unit do not match each other.

Receiving the request, the MA generator reads out data "Dn" and "Dn+1" shown in FIG. 14 from the memory 64, by page mode access. These data read out are sent to the MD controller 44 in sequence and forwarded to the data storage unit 45. The data storage unit 45 outputs the data corresponding to the access address to the system bus 60 through the BD controller 46 and keeps the data for the subsequent address inside.

(1.2) When the access address and the address for data held in the data storage unit 45 match each other.

The hit judging unit 42 informs the data storage unit 45 of their having matched and requests the MA generator to read out the address subsequent to the access address.

Responding to their match, the data storage unit 45 sends out the data of its own to the system bus 60 through the BD controller 46.

Figure 15:
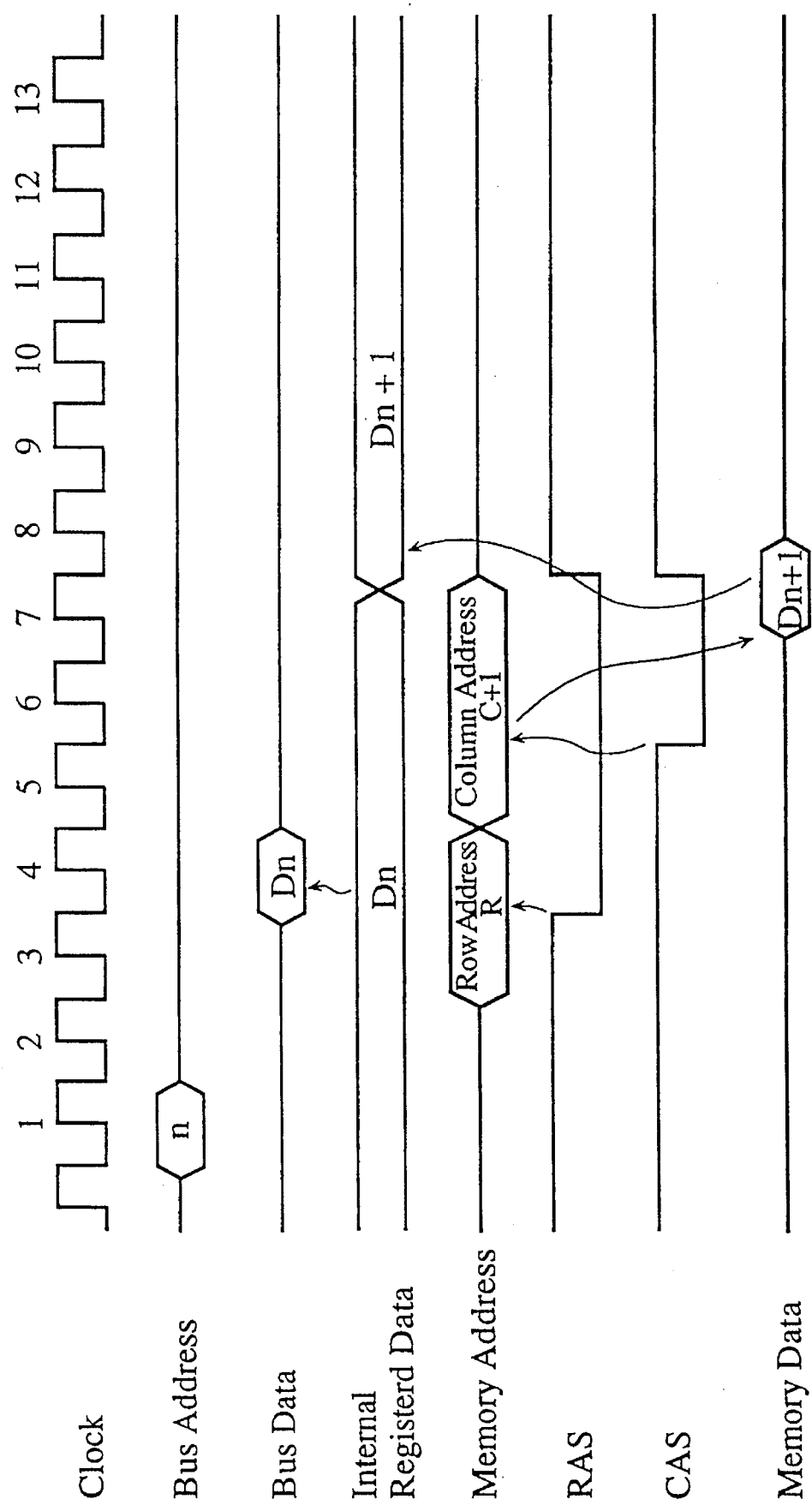
FIG. 15 shows a time chart depicting a data readout operation when an access address and the address for data held in the data storage unit match each other.

Receiving the request for reading out the data corresponding to the subsequent address, the MA generator 43 reads out the data from the memory 62 ("Dn+1" in FIG. 15). The data read out are sent to the MD controller 44 and forwarded to the data storage unit 45 to be kept therein.

(2) When the access data have smaller width than the memory 64

Whether the access address and the address of data held in the data storage unit 45 match or not, two different operations are possible, depending on the following two cases.

One case is when the access address is a final address within the 64-bit width of the memory 62. More specifically, the memory 62 has 64-bit data width so that three types of access width: 8, 16, and 32 bits can be possible. Provided that the addresses assigned per byte in the memory 62 are N, N+1, N+3, N+4, N+5, N+6, and N+7, eight addresses are possible to access 8-bit data: N, N+1, N+2, N+3, N+4, N+5, N+6, and N+7, four addresses are possible to access 16-bit data: N, N+2, N+4, and N+6, two addresses are possible to access 32-bit data: N and N+4. The above-mentioned "final address" means the address N+7 to access 8-bit data and the address N+6 to access 16-bit data, and the address N+4 to access 32-bit data. In other words, these are cases where data including final byte in the 64-bit data are accessed.

The other case is that the access address is not the final address.

(2.1) When the access address does not match the address of data held in the data storage unit 45 and is the final address In this case, both the data for the access address and the address subsequent to the access address are read out from the memory 62. The data corresponding to the access address are sent out to the system bus 60 and the data of the subsequent address are kept in the data storage unit 45 as shown in the time chart in FIG. 14.

Figure 16:
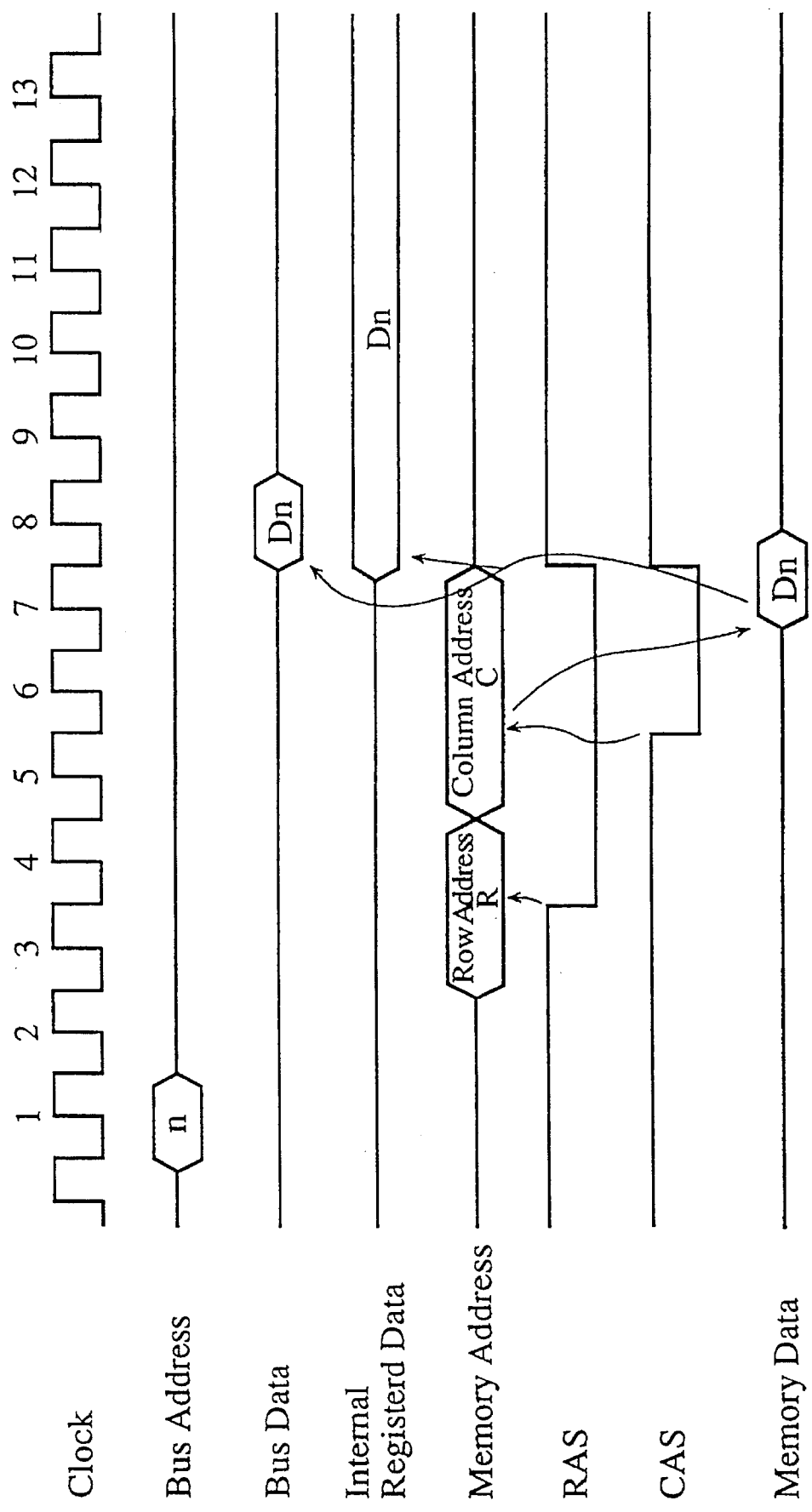
FIG. 16 shows a time chart depicting a data readout operation when an access address does not match the address of data held in the data storage unit and is not the final address within the 64-bit width of the memory 62.

(2.2) When the access address does not match the address of data held in the data storage unit 45 and is not the final address With the reference to the time chart in FIG. 16, the hit judging unit 42 requests the MA generator 43 to read out the data corresponding to the access address. At the same time, the access data size determining unit 56 in the hit judging unit 42 informs the state control unit 57 that the access address is not the final address. The state control unit 57 makes the latch control unit 58 forward the access data to the data storage unit 45.

Responding to the access request, the MA generator 43 reads out the data from the memory 62 ("Dn" in FIG. 16). The data read out are sent to the MD controller 44 and forwarded to the data storage unit 45. The data storage unit 45 keeps the data inside under control of the latch control unit 58 and also sends out them to the system bus 60 through the BD controller 46.

(2.3) When the access address matches the address of data held in the data storage unit 45 and is the final address In this case, the operations depicted by the time chart in FIG. 15 are carried out. More precisely, the hit judging unit 42 informs the data storage unit 45 that the access address and the address of data held in the data storage unit 45 match and requests the MA generator to read out an address subsequent to the access address from the memory 62.

Being informed of their match, the data storage unit 45 outputs the data of its own to the system bus 60 through the BD controller 46.

Responding to the request for reading the subsequent address, the MA generator 43 reads out the data corresponding to the subsequent address from the memory 62 ("Dn+1" in FIG. 15). The data read out are sent to the MD controller 44 and forwarded to the data storage unit 45 to be kept therein.

(2.4) When the access address matches the address of data held in the data storage unit 45 and is not the final address With reference to the time chart in FIG. 17, the hit judging unit 42 requests the data storage unit 45 to output the data of its own. At the same time, the access data size determining unit 56 informs the state control unit 57 that the access address is not the final address. Then the state control unit 57 makes the latch control unit 58 keep the data storage unit 45 out of updating data.

Responding to the instruction from the hit judging unit 42, the data storage unit 45 sends out the data of its own to the system bus 60 through the BD controller 46.

Thus, access data are sent from the data storage unit 45 to the system bus 60, which can reduce the time required for reading data out of the memory 62.

Although the access address sent from the system bus 60 is sent to the hit judging unit 42 by way of the BA decoder 41 in this embodiment, it may be directly inputted to the hit judging unit 42 by connecting the hit judging unit 42 directly to the system bus 60. This construction contributes to further reduction in access time because the hit judging unit 42 operates in parallel to the BA decoder 41. However, this undesirably increases the burden of the system bus 60.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A control apparatus for controlling data read access to memory, in response to an access request sent through a system bus, said control apparatus comprising:

a data storage means for preserving data corresponding to a predetermined address;

a judging means for judging whether an access address indicated by said access request matches the predetermined address, said judging means comprising:

a validity judging means for judging whether the data preserved in said data storage means are valid or invalid;

an address storage means for preserving an address indicating said data preserved in said data storage means;

a hit judging means for judging whether said access address matches the address preserved in said address storage means for judging that said access address does not match the address preserved in said address storage means, when said validity judging means judged the data to be invalid; and a data size judging means for detecting that access data have smaller data width than said memory and do not include a final position of the data width of said memory;

a control means for making said data storage means output data preserved therein to the system bus when said access address has been judged to match the predetermined address, and for making said data storage means hold data corresponding to a next address subsequent to said access address when said access address has been judged not to match the predetermined address, said control means comprising:

an address generation means for generating said next address when said access address has been judged to match the address preserved in said address storage means, for generating said access address and said next address in sequence and forwarding to said control means when said access address has been judged not to match the address preserved in said address storage means, and for suspending to generate said next address when a result detected by said data size judging means has been informed, wherein said data size judging means informs said address generation means of the result detected by said data size judging means; and a latch control means for, when data corresponding to said next address has been read out from said memory, making said data latch means latch said data.

2. The apparatus of claim 1, wherein said memory is unsuitable to be applied cache memory.

3. The apparatus of claim 1, wherein said memory is a frame memory for storing image data.

4. The apparatus of claim 3, wherein said next address indicates data subsequent to data corresponding to said access address, said data indicated by said next address having a same data width as said memory.

5. A control apparatus for controlling data read accesses to memory in response to an access request sent through a system bus, the control apparatus comprising:

a data storage means for preserving data corresponding to a predetermined address, said data storage means comprising:

a data latch means for latching said data outputted from a memory; and a selection means for selecting said data latched by said data latch means when said access address has been judged to match the predetermined address and for selecting data outputted from said memory when said access address has been judged not to match the predetermined address, thereby forwarding selected data to the system bus;

a judging means for judging whether an access address indicated by said access request matches the predetermined address, said judging means comprising:

an address storage means for preserving an address indicating said data latched by said data latch means;

a hit judging means for judging whether said access address matches the address preserved in said address storage means;

a validity judging means for judging whether the data preserved in said data storage means are valid or invalid and for informing said judging means of a first result judged by said validity judging means, wherein said hit judging means judges that said access address matches the address preserved in said address storage means when informed of invalidity; and a data size judging means for detecting that access data have smaller data width than said memory and do not include a final position of the data width of said memory;

a control means for making said data storage means output data preserved therein to the system bus when said access address has been judged to match the predetermined address, and for making said data storage means hold data corresponding to a next address subsequent to said access address when said access address has been judged not to match the predetermined address, wherein said next address indicates data subsequent to data corresponding to said access address, said data indicated by said next address having a same data width as said memory, said control means comprising:

an address generation means for generating said next address when said access address has been judged to match the address preserved in said address storage means, and for generating said access address and said next address in sequence and forwarding to said control means when said access address has been judged not to match the address preserved in said address storage means wherein said address generation means suspends an operation of generating said next address upon receiving said first result and said data size judging means informs said address generation means of a second result detected by said data size judging means; and a latch control means for, when data corresponding to said next address has been read out from said memory, making said data latch means latch said data.

6. A control apparatus for controlling data read accesses to memory in response to an access request sent through a system bus, the control apparatus comprising:

a data storage means for preserving data corresponding to a predetermined address, said data storage means comprising:

a data latch means for latching said data outputted from a memory; and a selection means for selecting said data latched by said data latch means when said access address has been judged to match the predetermined address and for selecting data outputted from said memory when said access address has been judged not to match the predetermined address, thereby forwarding selected data to the system bus;

a judging means for judging whether an access address indicated by said access request matches the predetermined address, said judging means comprising:

an address storage means for preserving an address indicating said data latched by said data latch means;

a hit judging means for judging whether said access address matches the address preserved in said address storage means;

a validity judging means for judging whether the data preserved in said data storage means are valid or invalid and for informing said judging means of a result judged by said validity judging means, wherein said hit judging means judges that said access address matches the address preserved in said address storage means, when informed of invalidity; and a data size judging means for detecting that access data have smaller data width than said memory and do not include a final position of the data width of said memory;

a control means for making said data storage means output data preserved therein to the system bus when said access address has been judged to match the predetermined address, and for making said data storage means hold data corresponding to a next address subsequent to said access address when said access address has been judged not to match the predetermined address, wherein said next address indicates data subsequent to data corresponding to said access address, said data indicated by said next address having a same data width as said memory, said control means comprising:

an address generation means for generating said next address when said access address has been judged to match the address preserved in said address storage means, and for generating said access address and said next address in sequence and forwarding to said control means when said access address has been judged not to match the address preserved in said address storage means wherein said address generation means suspends an operation of generating said next address upon receiving said first result and said data size judging means informs said address generation means of a second result detected by said data size judging means, said address generation means comprising:

a first incrementer for incrementing said access address;

a first selector for selecting an output of said first incrementer when said access address has been judged to match the address preserved in said address storage means and selecting a high order address when said access address has been judged not to match the address preserved in said address storage means;

a latch circuit for latching an output of said first selector;

a second incrementer for incrementing the output of said first selector; and a second selector for selecting an output of said latch circuit when said access address has been judged to match the address preserved in said address storage means and for selecting said output of said latch circuit and then selecting an output of said second incrementer as an updated access address to said memory when said access address has been judged no to match the address preserved in said address storage means; and a latch control means for, when data are read out from said memory, making said data latch means latch said data corresponding to said next address generated by said address generation means, wherein said control means controls said data read access to said memory by a use of said access address outputted from said address generation means.

* * * * *